(12) United States Patent
Kino et al.

(10) Patent No.: US 9,550,253 B2
(45) Date of Patent: Jan. 24, 2017

(54) FIBER LASER BEAM MACHINE

(75) Inventors: Hiroshi Kino, Tokyo (JP); Naoki Miyamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 14/403,704

(22) PCT Filed: Jun. 28, 2012

(86) PCT No.: PCT/JP2012/066604
§ 371 (c)(1),
(2), (4) Date: Nov. 25, 2014

(87) PCT Pub. No.: WO2014/002236
PCT Pub. Date: Jan. 3, 2014

(65) Prior Publication Data
US 2015/0158124 A1    Jun. 11, 2015

(51) Int. Cl.
*B23K 26/08* (2014.01)
*B23K 26/30* (2014.01)
*B23K 37/00* (2006.01)
*G02B 6/42* (2006.01)
*G02B 6/36* (2006.01)
*G02B 6/44* (2006.01)

(52) U.S. Cl.
CPC ............ *B23K 26/422* (2013.01); *B23K 26/08* (2013.01); *B23K 26/702* (2015.10); *B23K 37/006* (2013.01); *G02B 6/3624* (2013.01); *G02B 6/4296* (2013.01); *G02B 6/44* (2013.01)

(58) Field of Classification Search
CPC ..... B23K 26/08; B23K 26/422; B23K 26/702; B23K 37/006; G02B 6/3624; G02B 6/4296; G02B 6/44
See application file for complete search history.

(56) References Cited

U.S. PATENT DOCUMENTS

| 5,660,748 A | * | 8/1997 | Tanaka | B23K 26/06 219/121.6 |
| 6,208,458 B1 | * | 3/2001 | Galvanauskas | G02F 1/39 359/330 |

(Continued)

FOREIGN PATENT DOCUMENTS

| DE | 4234342 A1 | * | 4/1994 |
| JP | 8-238586 A | | 9/1996 |

(Continued)

OTHER PUBLICATIONS

Machine translation of Japan Patent document No. 2011-121,107, May 2016.*

(Continued)

*Primary Examiner* — Geoffrey S Evans
(74) *Attorney, Agent, or Firm* — Sughrue Mion, PLLC

(57) ABSTRACT

A fiber laser beam machine includes a machining head that condenses a laser beam and irradiates the laser beam on a workpiece; a fiber that guides the laser beam output from a laser oscillator to the machining head; a fiber connector that fixedly joins the fiber to the machining head; a cable holding device such as a cable bear (registered trademark) that is flexible, is in a U shape, and houses the fiber; and a fixing section that fixedly joins the cable holding device to the machining head.

4 Claims, 7 Drawing Sheets

(56) References Cited

U.S. PATENT DOCUMENTS

2007/0199929 A1* 8/2007 Rippl .................. B23K 26/04
                                                    219/121.78
2011/0305249 A1* 12/2011 Gapontsev .......... B23K 26/043
                                                    372/6

FOREIGN PATENT DOCUMENTS

| JP | 11-5187 A |   | 1/1999 |
|----|-----------|---|--------|
| JP | 2001-71165 A |   | 3/2001 |
| JP | 2002-336985 A |   | 11/2002 |
| JP | 2011-121107 A | * | 6/2011 |
| JP | 2011-121107 A |   | 6/2011 |
| JP | 2011-177727 A |   | 9/2011 |

OTHER PUBLICATIONS

International Search Report for PCT/JP2012/066604 dated Oct. 2, 2012.
Communication dated Aug. 3, 2015 from the State Intellectual Property Office of the People's Republic of China in counterpart application No. 201280074347.X.

* cited by examiner

FIBER LASER BEAM MACHINE

CROSS REFERENCE TO RELATED APPLICATIONS

This application is a National Stage of International Application No. PCT/JP2012/066604 filed Jun 28, 2012, the contents of which are incorporated herein by reference in their entirety.

FIELD

The present invention relates to a laser beam machine that irradiates a laser beam on a workpiece via a fiber.

BACKGROUND

Laser beam machines include fiber laser beam machines and $CO_2$ laser beam machines. A fiber laser beam machine guides a laser beam (a beam) to a machining head along a fiber and irradiates the laser beam on a workpiece. A $CO_2$ laser beam machine guides a laser beam to a machining head by reflecting the laser beam with a mirror and irradiates the laser beam on a workpiece from a machining head. When laser beam machining is applied to the workpiece by these laser beam machines, the machining head is moved to a desired position to irradiate the laser beam on the workpiece. Therefore, the machining head sometimes collides with the workpiece or the like.

Heretofore in $CO_2$ laser beam machines, a mechanism has been used to reduce damage to the Z-axis driving component (the component that drives the machining head in the Z-axis direction) if the machining head collides with the workpiece or the like. In this mechanism, due to the propagation of the laser beam being performed by a mirror, it is necessary for the machining head and the propagation source of the laser beam (the component from which the laser beam is directly guided into the machining head) to be separate.

In contrast, in the fiber laser beam machine, it is necessary to connect the propagation source of the laser beam (the fiber) to the machining head. Therefore, the damage reducing mechanism used in $CO_2$ laser beam machines are not applicable to fiber laser beam machines.

In the laser cutting apparatus described in Patent Literature 1, a magnet is disposed in both or any one of a laser torch or a torch holder and the laser torch is held by the attraction of the magnet. This makes it possible to easily replace the laser torch.

CITATION LIST

Patent Literature

Patent Literature 1: Japanese Patent Application Laid-Open No. 2001-71165

SUMMARY

Technical Problem

With the conventional technology described above, there is a problem however in that the damage done to the fiber and the fiber connector if the machining head collides with them cannot be reduced.

The present invention has been made in view of the above and it is an objective of the present invention to provide a fiber laser beam machine that can reduce the damage done to a fiber and a fiber connector if a machining head collides with them.

Solution to Problem

To solve the problem and achieve the objective described above, the present invention relates to a fiber laser beam machine includes: a machining head that irradiates a laser beam on a workpiece; a fiber that guides the laser beam to the machining head; a fiber connector that fixedly joins the fiber to the machining head; a cable holding device that is made flexible and that houses the fiber; and a fixing section that fixedly joins the cable holding device to the machining head.

Advantageous Effects of Invention

According to the present invention, there is an effect whereby it is possible to reduce the damage done to the fiber and the fiber connector if the machining head collides with them.

BRIEF DESCRIPTION OF DRAWINGS

FIG. 3-1 is a front view of a machining head and the cable holding device.

FIG. 3-2 is a side view of the machining head and the cable holding device.

FIG. 5-1 is a diagram illustrating a position to which the machining head moves if a lower part side of the machining head deviates from a Z-axis driving section.

FIG. 5-2 is a diagram illustrating a position to which the machining head moves if an upper part side of the machining head deviates from the Z-axis driving section.

FIG. 6-1 is a front view illustrating a position to which the machining head moves if the machining head receives an impact in the upward direction.

FIG. 6-2 is a side view illustrating the position to which the machining head moves if the machining head receives an impact in the upward direction.

DESCRIPTION OF EMBODIMENTS

A fiber laser beam machine according to an embodiment of the present invention is described in detail below with reference to the drawings. Note that the present invention is not limited to the embodiment.

Embodiment

Figure 1:
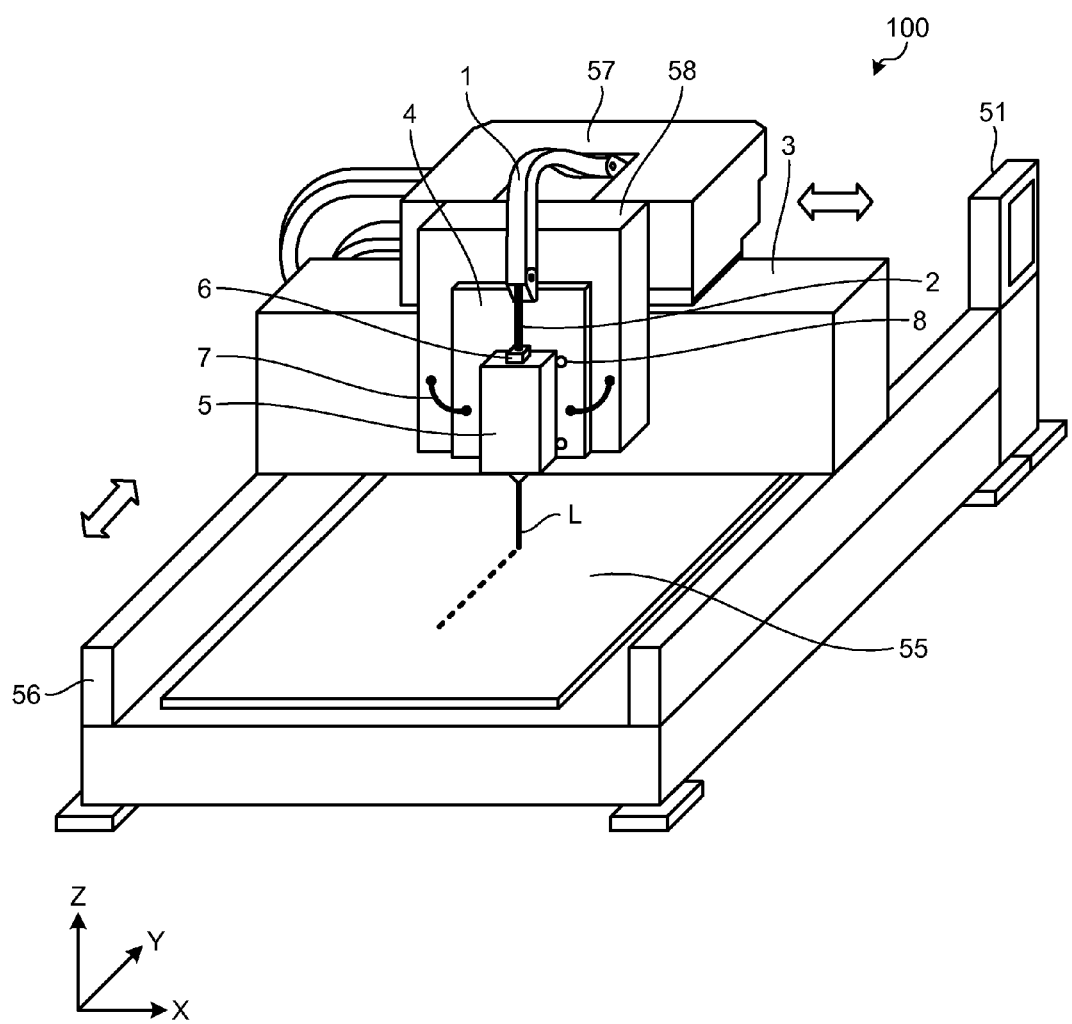
FIG. 1 is a configuration diagram illustrating a fiber laser beam machine according to an embodiment.

FIG. 1 is a configuration diagram illustrating a fiber laser beam machine according to an embodiment. A fiber laser beam machine 100 includes a cable holding device 1, a fiber 2, a Y-axis moving section 3, an X-axis/Z-axis moving section 57, a Y-axis guide 56, a supporting section 58, a fixing section 4, a machining head 5, a fiber connector 6, wires 7, machining-head fixing bolts 8, and a control device 51.

Figure 2:
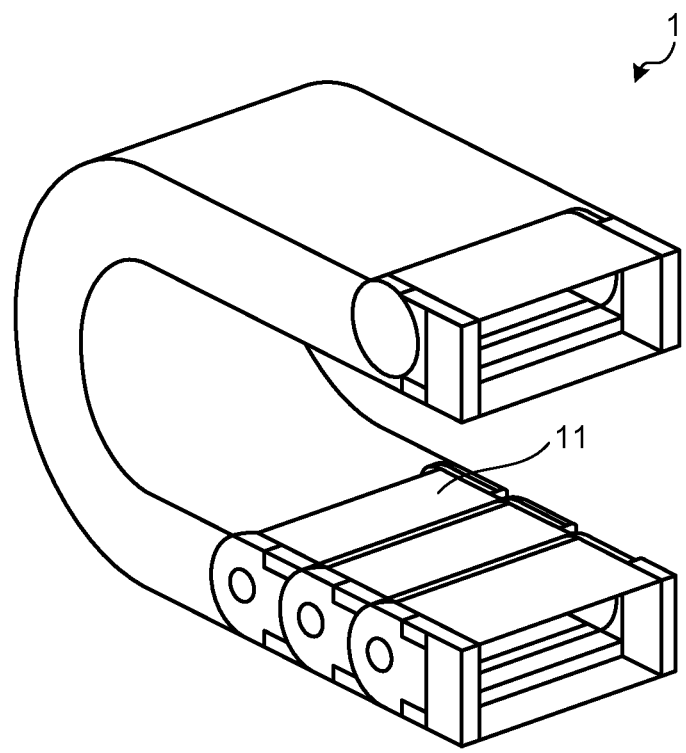
FIG. 2 is a configuration diagram illustrating a part of a cable holding device.

The cable holding device 1 is a bendable device such as a cable bear (registered trademark) that holds and guides the fiber 2. A caterpillar made of resin is, for example, used as the cable holding device 1. FIG. 2 is a configuration diagram illustrating a part of the cable holding device. The cable holding device 1 has a configuration in which a large number of coupling bodies 11 are turnably coupled to one another in a long chain shape. The cable holding device 1 is configured to be capable of housing the fiber 2. The cable holding device 1 is curved (bent) in a U shape along the fiber 2. One end of the cable holding device 1 is fixedly joined to the fixing section 4; and the other end of the cable holding device 1 is fixedly joined to a predetermined member (a member other than the fixing section 4) (e.g., the X-axis/Z-axis moving section 57) on the rear surface side of the fixing section 4.

The fiber 2 guides a laser beam (a beam) L output from a laser oscillator (not illustrated in the figure) to the machining head 5. The fiber 2 is stored in the cable holding device 1 so as to be movable within the cable holding device 1.

The fixing section 4 is, for example, a plate-like member and is fixedly joined to the cable holding device 1 and the machining head 5. Due to this configuration, the fixing section 4 fixedly joins the cable holding device 1 to the machining head 5. The fixing section 4 is joined to, for example, the rear surface of the machining head 5.

The machining-head fixing bolts 8 are bolts that fix the machining head 5 to the fixing section 4. The machining-head fixing bolts 8 are made from, for example, resin bolts. The machining-head fixing bolts 8 are made to be more fragile than the other members (the fixing section 4, the Y-axis moving section 3, or the like) such that the machining-head fixing bolts 8 will break if the machining head 5 collides with the other members. The fixing section 4 is configured such that the fixing section 4 and the machining head 5 come away from the supporting section 58 if the machining head 5 receives an impact.

The X-axis/Z-axis moving section 57 moves the machining head 5 in an X-axis direction and a Z-axis direction. The Z-axis direction is in the same direction as the irradiation direction of the laser beam L and is, for example, in the vertical direction. When the machining head 5 moves in the Z-axis direction, the supporting section 58, the fixing section 4, and the cable holding device 1 move in the Z-axis direction together with the machining head 5. The X-axis/Z-axis moving section 57 itself moves on the Y-axis moving section 3 in the X-axis direction, whereby the machining head 5 moves in the X-axis direction. The Y-axis guide 56 is a guide extending in the Y-axis direction. The Y-axis moving section 3 moves on the Y-axis guide 56 in the Y-axis direction. The supporting section 58 detachably holds the fixing section 4.

The machining head 5 condenses the laser beam L sent through the fiber 2 and irradiates the laser beam L on a workpiece (work) 55. The fiber connector 6 is a connector that fixedly joins the fiber 2 to the machining head 5.

The wires 7 connect the fixing section 4, which is joined to the machining head 5, to the supporting section 58. The wires 7 are connected to the fixing section 4 and the supporting section 58 in a slackened state. Due to this configuration, even if the machining head 5 collides with another member (e.g., the workpiece 55) and comes off the supporting section 58, the machining head 5 is supported (suspended) by the wires 7 via the fixing section 4. Therefore, it is possible to prevent the machining head 5 from falling. The control device 51 controls the Y-axis moving section 3, the X-axis/Y-axis moving section 57, the laser oscillator, and the like.

In the embodiment, the fixing section 4 and the machining head 5 are in contact with each other on the ZX plane. In the following description, it is assumed that the front surface of the machining head is a surface on the opposite side of a surface of the machining head 5 that is in contact with the fixing section 4. Therefore, when the machining head 5 is viewed from the minus Y-axis direction to the plus Y-axis direction, the machining head 5 is viewed from the front surface side. Note that, when the fixing section 4 and the machining head 5 are in contact with each other on the ZX plane, the upper surface and the bottom surface of the machining head 5 are parallel to the XY plane and the right side surface and the left side surface of the machining head 5 are parallel to the YZ plane.

Figures 1, 3:
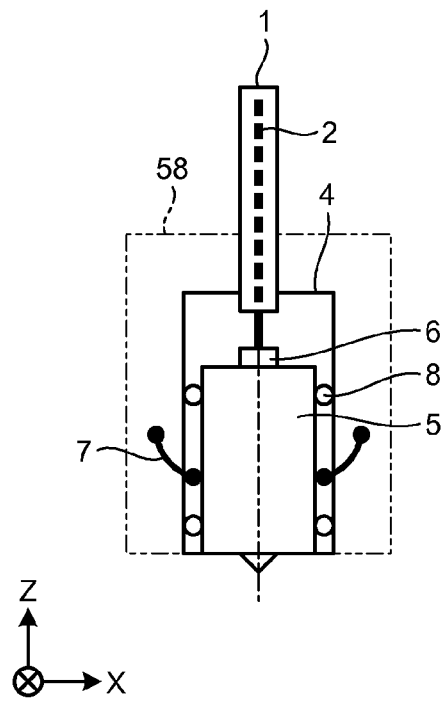
Figures 2, 3:
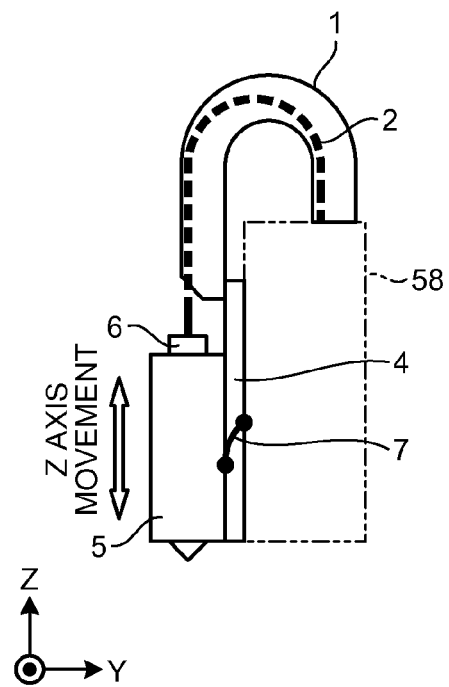

Next, a connection configuration of the machining head 5 and the cable holding device 1 is described with reference to FIG. 3-1 and FIG. 3-2. FIG. 3-1 is a front view of the machining head and the cable holding device. FIG. 3-2 is a side view of the machining head and the cable holding device. The machining head 5 is fixedly joined to the cable holding device 1 on one end side (the upper side) by the fixing section 4. The machining head 5 irradiates the laser beam L from the other end side (the lower side). Due to this configuration, if the machining head 5 is in collision and the fixing section 4 and the machining head 5 come away from the supporting section 58, the cable holding device 1 is deformed and the fiber 2 moves together with the machining head 5.

Figure 4:
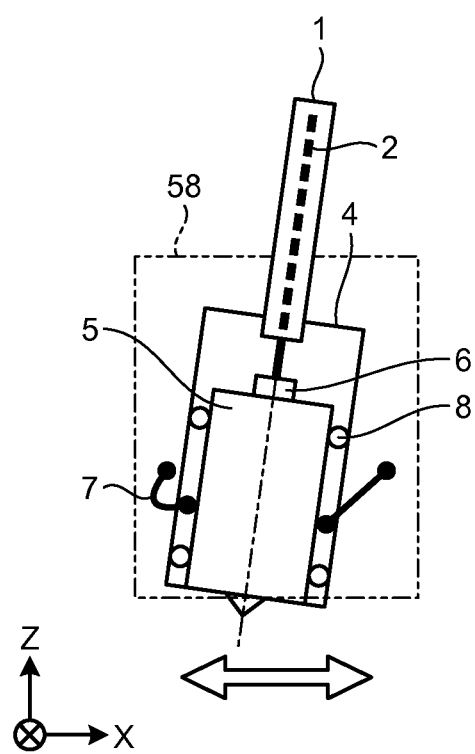
FIG. 4 is a diagram explaining a position to which the machining head moves if the machining head receives an impact in the left to right direction.

Next, a position to which the machining head 5 moves if the machining head 5 receives an impact in the left right direction (the X-axis direction) is described. FIG. 4 is a diagram illustrating a position to which the machining head moves if the machining head receives an impact in the left right direction. FIG. 4 illustrates the tilt of the machining head 5 and the cable holding device 1 when the machining head 5 is viewed from the front surface side.

If the machining head 5 collides with the workpiece 55 or the like and receives an impact in the left right direction, the machining head 5 causes positional deviation in the left right direction with respect to the supporting section 58. Even in this case, because the cable holding device 1 follows the movement of the machining head 5, positional deviation and angular deviation do not occur between the machining head 5 and the cable holding device 1.

Figures 1, 5:
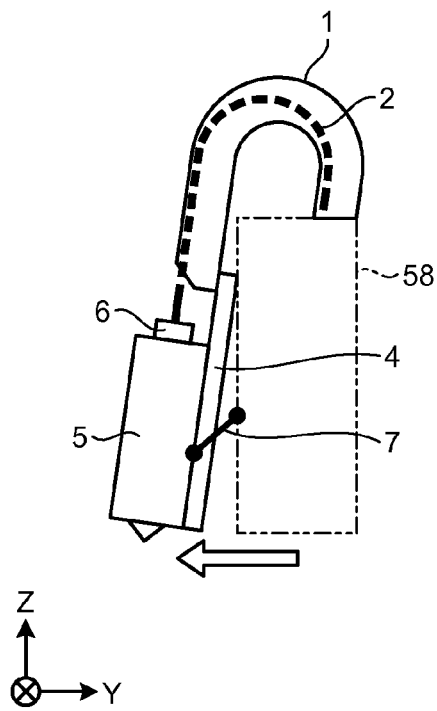
Figures 2, 5:
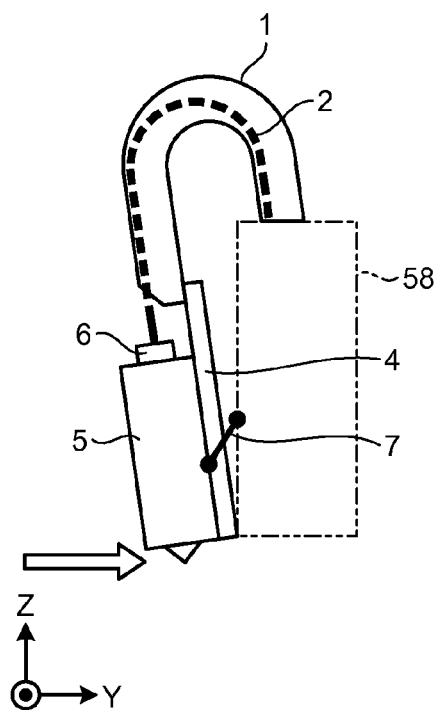

Next, the position is described to which the machining head 5 moves if the machining head 5 receives an impact in the front back direction (the Y-axis direction). FIG. 5-1 and FIG. 5-2 are side views of positions to which the machining head 5 moves if the machining head 5 receives an impact in the front back direction. FIG. 5-1 is a diagram illustrating a position to which the machining head moves if the lower side of the machining head comes off the Z-axis driving section. FIG. 5-2 is a diagram illustrating a position to which the machining head moves if the upper side of the machining head comes off the Z-axis driving section. In FIG. 5-1 and FIG. 5-2, there is an illustration of the tilts of the machining head 5 and the cable holding device 1 when the machining head 5 is viewed from the right side surface side.

If the machining head 5 collides with the workpiece 55 or the like and the lower side of the machining head 5 receives an impact in the front back direction, the lower side of the machining head 5 is made to perform a positional deviation in the front back direction with respect to the supporting section 58. If the machining head 5 collides with the workpiece 55 or the like and the upper side of the machining head 5 receives an impact in the front back direction, the upper side of the machining head 5 is made to perform a positional deviation in the front back direction with respect to the supporting section 58. Even in these cases, because the cable holding device 1 follows the movement of the machining head 5, positional deviation and angular deviation do not occur between the machining head 5 and the cable holding device 1.

Figures 1, 6:
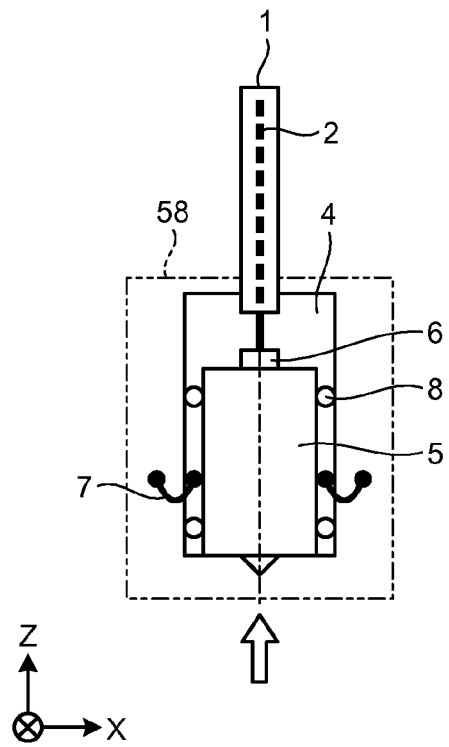
Figures 2, 6:
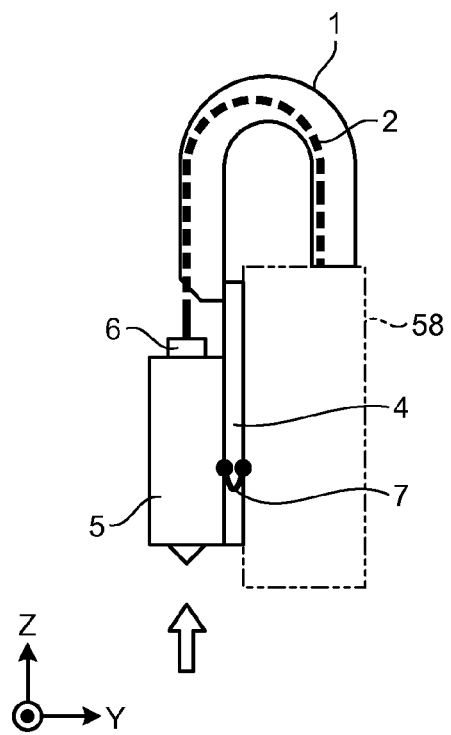

Next, a position is described to which the machining head 5 moves if the machining head 5 receives an impact in the upward direction (the Z-axis direction). FIG. 6-1 is a front view illustrating a position to which the machining head moves if the machining head receives an impact in the upward direction. FIG. 6-2 is a side view illustrating a position to which the machining head moves if the machining head receives an impact in the upward direction.

If the machining head 5 collides with the workpiece 55 or the like and receives an impact from the lower side to the upper side, the machining head 5 is made to perform a positional deviation in the upward direction with respect to the supporting section 58. Even in this case, because the cable holding device 1 follows the movement of the machining head 5, positional deviation and angular deviation do not occur between the machining head 5 and the cable holding device 1.

Note that, if the machining head 5 receives an impact in the combined directions of the left right direction, the front back direction, and the upward direction, the machining head 5 is made to perform positional deviation in the impact receiving direction with respect to the supporting section 58. Even in this case, because the cable holding device 1 follows the movement of the machining head 5, positional deviation and angular deviation do not occur between the machining head 5 and the cable holding device 1.

As described above, in the embodiment, even if the machining head 5 collides with the workpiece 55 or the like, positional deviation and angular deviation do not occur between the machining head 5 and the cable holding device 1. Therefore, positional deviation and angular deviation do not occur between the fiber 2 and the fiber connector 6 either. Therefore, it is possible to reduce damage to the fiber 2 and the fiber connector 6.

By reducing the damage to the fiber 2 and the fiber connector 6, it is possible to avoid breakage of the fiber 2 and the fiber connector 6. Consequently, it is possible to reduce replacement of the fiber 2 and the fiber connector 6. As a result, it is possible to prevent machine down time from being excessive. Furthermore, the service lives of the fiber 2 and the fiber connector 6 increase, which leads to a reduction in costs.

Figure 7:
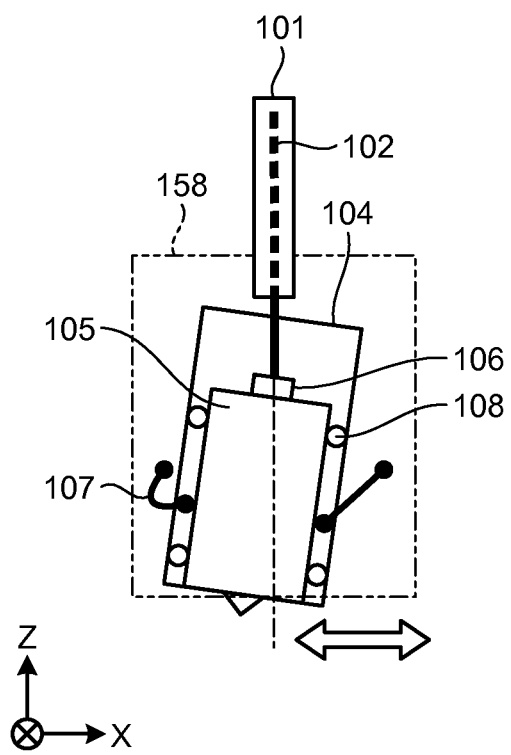
FIG. 7 is a diagram illustrating positions to which a machining head and a fiber in a conventional fiber laser beam machine move if the machining head receives an impact.

Here, the positions are described to which the machining head and the fiber in the conventional fiber laser beam machine move if the machining head collides with the workpiece 55 or the like. FIG. 7 is a diagram explaining the positions to which the machining head and the fiber in the conventional fiber laser beam machine move if the machining head receives an impact.

A conventional fiber laser beam machine includes a cable holding device 101, a fiber 102, a supporting section 158, a driven section 104, a machining head 105, a fiber connector 106, wires 107, and fixing bolts 108.

A driven section 104 is provided on the rear surface side of the machining head 105 and is driven by the supporting section 158. The driven section 104 is not fixedly joined to the cable holding device 101. In other words, in the conventional fiber laser beam machine, the cable holding device 101 and the machining head 105 are not fixedly joined to each other.

In such a conventional fiber laser beam machine, if the machining head 105 collides with the workpiece 55 or the like and receives an impact in some direction (in the left right direction in FIG. 7), the machining head 105 is made to perform positional deviation with respect to the supporting section 158. Here, because the cable holding device 101 and the machining head 105 are not fixedly joined, the cable holding device 101 does not follow the movement of the machining head 105. Therefore, positional deviation and angular deviation occur between the machining head 105 and the cable holding device 101. Further, positional deviation and angular deviation occur between the fiber 102 and the fiber connector 106. Consequently, loads concentrate on the fiber 102 and the fiber connector 106. Therefore, the fiber 102 and the fiber connector 106 are damaged.

In contrast, in the embodiment, because the cable holding device 1 is fixed to the machining head 5, positional deviation and angular deviation do not occur between the machining head 5 and the cable holding device 1. Therefore, it is possible to reduce damages to the fiber 2 and the fiber connector 6.

Note that, in the embodiment, the cable holding device 1 and the machining head 5 are fixedly joined via the fixing section 4. However, the cable holding device 1 and the machining head 5 can be directly joined together. The cable holding device 1 and the machining head 5 can also be fixedly joined using a member other than the fixing section 4.

Note that the fixing section 4 can be a non-elastic member or it can be an elastic member. When the fixing section 4 is made from an elastic member, the fixing section 4 is configured using an elastic member having a modulus of elasticity that is sufficient to prevent positional deviation and angular deviation from occurring between the machining head 5 and the cable holding device 1 even if the machining head 5 collides with the workpiece 55 or the like.

As described above, according to the embodiment, because the cable holding device 1 and the machining head 5 are fixedly joined together, the cable holding device 1 follows the movement of the machining head 5. Consequently, even if the machining head 5 collides with the workpiece 55 or the like and is made to perform positional deviation with respect to the supporting section 58, positional deviation and angular deviation do not occur between the machining head 5 and the cable holding device 1. Therefore, it is possible to reduce damage done to the fiber 2 and the fiber connector 6 if the machining head 5 is in a collision.

INDUSTRIAL APPLICABILITY

As described above, the fiber laser beam machine according to the present invention is suitable for the irradiation of a laser beam via a fiber.

REFERENCE SIGNS LIST

1 Cable holding device
2 Fiber
3 Y-axis moving section
4 Fixing section
5 Machining head
6 Fiber connector
7 Wires 55 Workpiece
57 X-axis/Z-axis moving section
58 Supporting section

The invention claimed is:

1. A fiber laser beam machine comprising:
a machining head that irradiates a laser beam on a workpiece;
a fiber that guides the laser beam to the machining head;
a fiber connector that fixedly joins the fiber to the machining head;
a cable holding device that is made flexible and that houses the fiber;
a fixing section that fixedly joins the cable holding device to the machining head; and
a supporting section that detachably holds the fixing section, wherein
the machine head is supported by wires via fixing section, the wires being connected to the fixing section and the supporting section.

2. The fiber laser beam machine according to claim 1, further comprising
a driving section that drives the machining head in a direction that is the same as an irradiation direction of the laser beam.

3. The fiber laser beam machine according to claim 1, wherein
one end of the cable holding device is fixedly joined to the fixing section and the other end is fixedly joined to a member other than the fixing section.

4. The fiber laser beam machine according to claim 1, wherein
the cable holding device is a bendable device.

* * * * *